E. T. FERNGREN.
PROCESS OF OBTAINING MOLD CHARGES OF GLASS AND APPARATUS THEREFOR.
APPLICATION FILED MAR. 22, 1917.
1,362,785.
Patented Dec. 21, 1920.
2 SHEETS—SHEET 2.
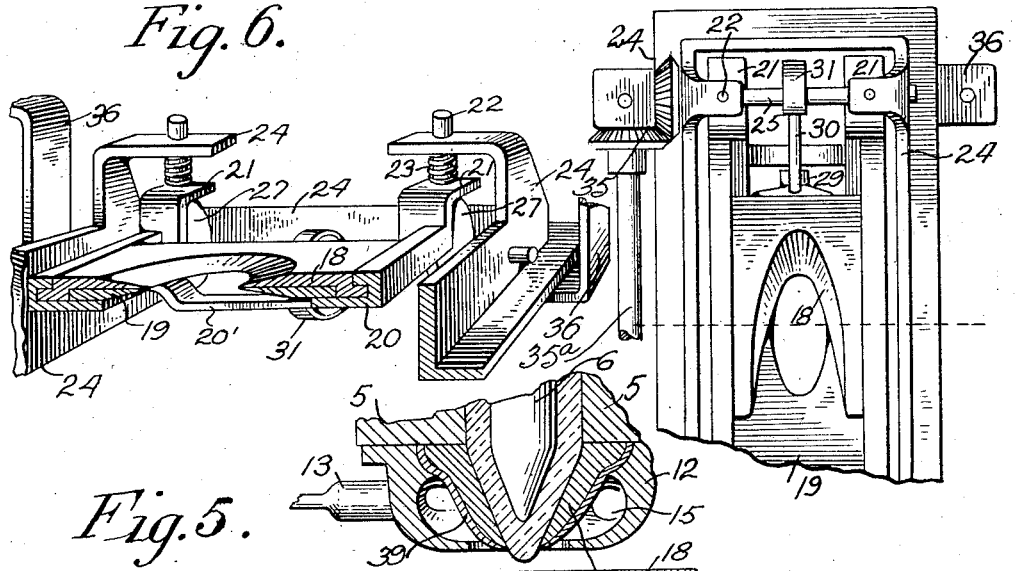
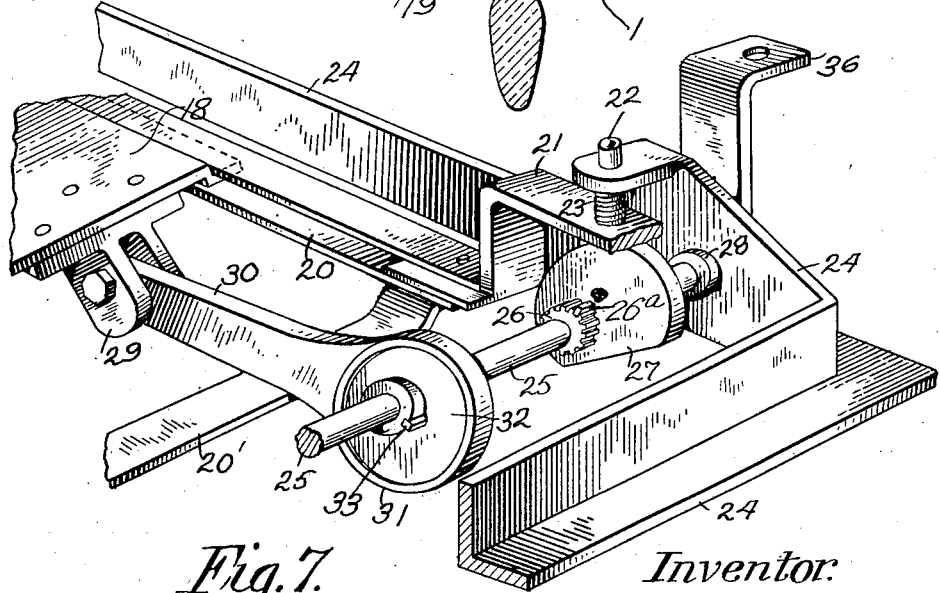
Inventor:
Enoch T. Ferngren.
By Wm H Honiss,
Attorney.

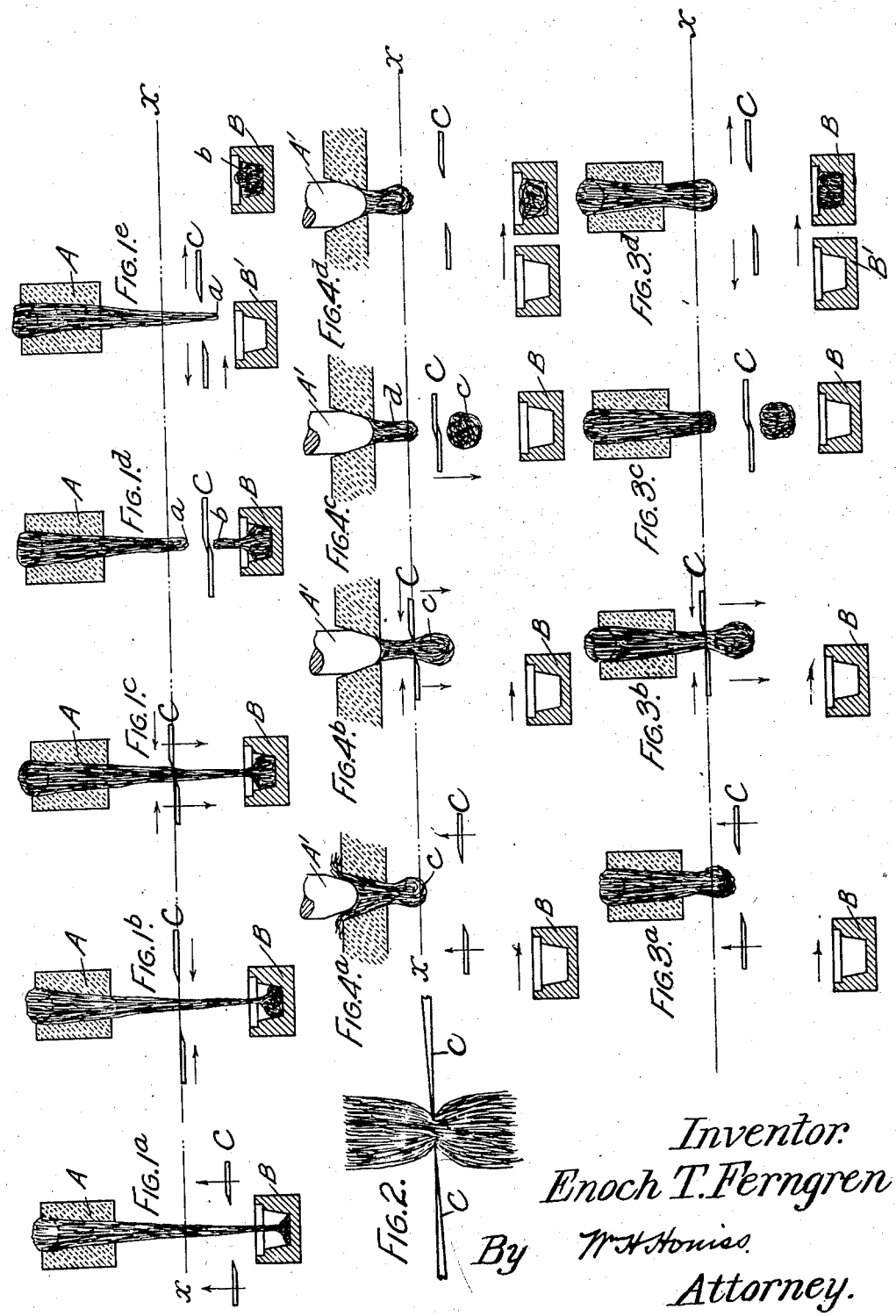

UNITED STATES PATENT OFFICE.

ENOCH T. FERNGREN, OF WASHINGTON, DISTRICT OF COLUMBIA, ASSIGNOR TO HARTFORD-FAIRMONT COMPANY, A CORPORATION OF NEW YORK.

PROCESS OF OBTAINING MOLD CHARGES OF GLASS AND APPARATUS THEREFOR.

1,362,785. Specification of Letters Patent. Patented Dec. 21, 1920.

Application filed March 22, 1917. Serial No. 156,717.

*To all whom it may concern:*

Be it known that I, ENOCH T. FERNGREN, a citizen of Sweden, and residing at Washington, in the District of Columbia, have invented new and useful Improvements in Processes of Obtaining Mold Charges of Glass and Apparatus Therefor, of which the following is a specification.

Among the methods which have been proposed for obtaining glass from a furnace is one comparable with that of pig-metal founding, in which the molten glass is caused to flow through a suitable outlet and is delivered, either mediate or immediately, to a receiving mechanism by which the glass is shaped, and it is to a method of this kind, and an apparatus for carrying out such method, that the present application is directed.

Many difficulties have been met in carrying out such a general process due to the characteristics of the material, and the nature of its flow. Among the problems involved is that of the segregation of the individual charges for the several articles to be made (which perhaps weigh a few pounds or a few ounces), from each other, and from the contents of the pool of glass contained within the heated furnace, which may amount to as much as one-hundred tons.

It has been proposed to flow glass continuously from a furnace outlet and to periodically interpose in the path of the issuing stream while flowing through the air under gravity, mechanism adapted both to sever such stream, and by supporting the glass at the severing plane to temporarily retard its downward movement to cause a discontinuity in the delivery of glass, during which a loaded mold may be removed and an empty mold placed in position to receive the glass accumulated on the severing means when released thereby.

This method is, however, objectionable, in that the support of the glass by the severing mechanism results in local changes of the characteristics of the glass, such as a cooling which will, in the manufacture of certain grades of ware, produce objectionable shear marks.

I propose to overcome the difficulties of local chilling above referred to by causing the severing means acting on the glass after its issuance from a furnace and while the glass is moving under any accelerating force (such for instance, as gravity as modified by other physical conditions which may be present), to have a component of movement during the severing of the glass which is parallel with the direction of movement of the glass. Preferably, as shown herein the movement of the severing mechanism is parallel with the movement of the glass, but it will be understood that this is not essential if it has a sufficient component of movement in such direction. By properly proportioning the component of this movement in respect to the velocity of glass movement at the severing point, several useful effects may be produced.

If the component of movement of the severing mechanism in the direction of the line of glass movement be greater than the movement of the glass immediately above the severing point at the time of severing, the severing mechanism will, during the severing, move away from the lower end of the glass above the severing point, thus moving all of the upper face of the shearing mechanism, except its extreme cutting edge, out of contact with the glass. As the cutting edge of the severing mechanism moves progressively through the glass, this means that no point in the lower end of the glass above the severing mechanism remains in continued contact with such mechanism, any contact which may exist being progressive through the glass, and being instantaneous at each point, so that there is no continuous period of heat-absorption from any point of the glass above the shearing point. To accomplish this result the downward velocity of the shearing mechanism need not, under certain circumstances, be greater than the speed of flow of the glass at the severing point prior to the commencement of the severing operation, as the surface tension tends to cause the end of the glass above the cut to assume a spherical form, with a drawing back of the edges of the cut.

If the severing mechanism has less downward velocity during the severing than the upper end of the glass below the severing point after the latter is cut off from its overhead support, the upper end of the lower part of the glass drops away from the severing mechanism so that no contact is maintained with the lower faces of the severing mechanism.

If, however, the shearing mechanism has a downward velocity in excess of the natural drop of the lower end of the stream of glass after it is severed, then such downward movement of the shears will serve to accelerate the downward movement of the lower part of the glass, and to thereby separate it from the glass issuing from the flow outlet, which latter glass is flowing more slowly, owing to the modification of its gravity drop by the tenacity of the glass connecting it with the glass in the outlet and by other conditions which may be present. This results in a time-interval between the drop to the level of the mold table of the severed glass, and the arrival at the same point of the down-coming end of the glass which was above the severing point, which interval may be used to effect a transfer of the molds.

My invention, therefore, consists in a process of obtaining mold charges from glass moving under an accelerated force after its issuance from a furnace outlet, whereby the contact between the severing means and the glass is reduced to a minimum, and by which any support for the glass is avoided, and to mechanism by which this process can be carried out, as will be hereinafter more fully described and claimed.

Referring to the accompanying drawings in which corresponding parts are designated by corresponding marks of reference,—

Figures 1ª to 1ᵉ are series of diagrammatic views showing a process falling within this invention.

Fig. 2 is an enlarged fragmental view showing the manner in which the cut in the glass opens up to prevent contact of the glass with the shears when the speed of the shears is properly related to the velocity of flow of the glass at the severing points.

Figs. 3ª, etc., and 4ª, etc., are each a series of diagrammatic views showing other processes of issuing glass to which my invention may be applied.

Fig. 5 is a flow outlet in the form of an orifice associated with a shear member, all suitable for carrying out this invention.

Fig. 6 is a transverse sectional view of a glass-shearing mechanism embodying this invention.

Fig. 7 is a fragmental longitudinal perspective view of said mechanism, and

Fig. 8 is a fragmental plan thereof.

In Figs. 1ª, etc., I have illustrated my invention as applied to severing glass continuously issuing from a flow outlet A of a receptacle (whether such receptacle be a tank, pot or ladle), containing molten glass. "Continuous" is here used as meaning that the flow from the outlet is continuous and without substantial change in rate during the issuance from the outlet of the glass to form a plurality of successive charges.

Fig. 1ª, represents the glass after the issuance from the outlet as having a stream form between the outlet and the mold B, suitable severing mechanism being indicated at C. In Fig. 1ᵇ, the continued flow of glass from the outlet and its flow into the mold has resulted in a more complete filling of the mold. The shearing mechanism has risen to the plane X—X, it being in a motion toward such plane in the position shown in Fig. 1ª as is represented by the arrow adjacent thereto in that figure. The glass stream in both of these figures is flowing downwardly, with a velocity at each point determined by the weight of the stream below such point, and the tenacity of the glass. In Fig. 1ᶜ, the severing mechanism is closing to sever the stream and is moved downwardly in the direction of the stream flow. In Fig. 1ᵈ, the severing action has been completed. The lower stub end a of glass stream above the severing point has continued to descend under gravity as modified by its own viscosity, while the upper end b of the severed glass is freely falling. This results in wide separation of the two parts of the stream. In Fig. 1ᵉ the lower stub end a has continued to descend, but has not as yet arrived at the level of the top of the molds. The filled mold B is represented as being removed from the loaded position and as being replaced by an empty one B', this being permitted by retardation of the flow of the end a after being relieved, by the severing operation, from the weight of the glass below the severing point. To permit the interchange of the molds, the severing mechanism should act upon the stream a sufficient distance above the molds to cause a sufficient time-interval between the fall of the end b to a position where it will surely enter the mold being filled as the latter is put in motion, and the descent of the end a to the level of the path of the upper tops of the mold to be sufficient for this purpose. The rate of descent of the upper end a will be affected by the distance between the severing point and the flow outlet, as the greater be such distance, the greater will be the velocity of such end after cutting. By proper proportioning these distances, the desired time-interval may be obtained.

It will be noted that in these figures, the glass not only continuously issues from the flow-outlet, but is at its cutting point (due to the location of such point at some distance below the outlet), a practically unsupported freely-flowing stream of molten material. If the downward movement of the severing mechanism in positions represented in 1ᶜ and 1ᵈ, that is to say, while such severing mechanism is interposed in the path of the glass flow, be equal to or greater than the rate of downward flow of the glass, the unsupported freely flowing stream of glass will not be supported in any way by the severing mechanism during the severing. This is represented in Fig. 2 which shows a condition occurring when the severing mechanism moves downwardly during the severing at a greater rate of speed than the stream flow at the severing point. Under these conditions, the downward movement of the shearing mechanism will actually result, not in a support of the glass stream, but in a downward dragging, or a slight acceleration, of the stream between the cutting edges which is not transmitted to the cut surfaces of the stream above the blades, leaving as it were, a gap between the top of the severing blades and the walls of the cut in the glass. From this follows that the point of contact between the knives and the glass is only at the extreme cutting edges, and that this point of contact is a translatory point, so that no part of the glass stream above the cutting plane has maintained contact with the severing mechanism.

The weight of the glass below the severing point also tends to draw the edges of the cut therein away from the lower faces of the severing mechanism, so that no continued contact is maintained between the glass and the lower sides of the blades, unless, as is possible and perhaps desirable under certain conditions, the downward movement of the severing mechanism be greater than the initial free velocity of the severed end $b$ of the glass after severing. In this case, the severing mechanism will act to accelerate the downward movement of the end $b$ and to this extent prolong the time interval in which the molds can be changed as before discussed.

In Figs. 1ª, etc., I have illustrated a process in which the glass flows continuously as a stream into a mold to form the mold charge and in which the location of the severing mechanism is such as to afford a time-interval, but the invention, in its broader aspects, is not limited to a continuous flow of glass, as it is capable of successful and desirable use in cases in which the glass be either a pulsating or intermittent feed from the orifice, or is fed from the orifice at such a rate that the lower end of the stream issuing from the orifice and while supported therefrom is cut off into the desired mold charges, which charges are allowed to drop freely under the influence of gravity into the molds, the mold change being made during the time required for the accumulation below the furnace outlet of the successive charges, and in Figs. 3ª and 4ª, respectively, I have illustrated forms of my invention in which glass is delivered to the molds in pre-accumulated charges as opposed to stream delivery. The accumulation of these charges takes place immediately beneath the flow outlet and each charge is severed from the glass issuing from the outlet while suspended by its tenacity from the outlet, the severing taking place before any part of a charge rests on the mold. In this method of obtaining glass, the severing mechanism acts upon the glass closer to the outlet than that shown in Figs. 1ª, etc., in which the stream flows directly into the mold. Inasmuch as the charge delivery to the mold is practically instantaneous and *en masse*, ample time is afforded in which to make the mold changes, so that with this method of obtaining glass, no support of the glass by the shears to permit mold change has heretofore been necessary, although with such method as it has been heretofore used in certain cases, such support has been incidental to the operation of severing, due to the time consumed by the mechanism in shearing, and the fact that shearing mechanism has, for mechanical reasons been in the form of flat blades.

Fig. 3ª, represents a condition occurring on the initial issuance of glass from a flow orifice. As there shown, the glass, after its issuance is slightly enlarged in diameter over the diameter of the issuing outlet and hangs pendant as a gob. In Fig. 3ᵇ, the flow has continued and a mass of glass sufficient to form a complete mold charge hangs from the outlet and below the plane X—X, in which the severing mechanism starts its action. As represented in this figure, the severing mechanism has started to sever the glass and is moving downwardly during such severing. In Fig. 3ᶜ, the severing of the charge has been fully completed, and the severed charge now drops, if the proportions and timing have been proper therefor, in a more or less spherical mass into the mold B, which mold may have been inserted into position to receive such mass during the intervals illustrated in Figs. 3ª and 3ᵇ, that is to say, during the formation of the charge. In Fig. 3ᵈ, the severing mechanism has been opened and the formation of another gob similar to that shown in Fig. 3ª has been begun. In this method of severing glass, the severing plane is at such a distance below the orifice that the glass at such plane is not a stream freely flowing, the severing plane being by preference so selected that the gravity flow of the glass is retarded to a substantial extent by its tenacity, and the proportions of the parts should be such that a full mold charge may hang suspended from the flow outlet beneath the severing point and without resting on the mold.

Nor is my invention limited to cases in which the flow from the outlet is continuous. It is equally applicable, if the flow from the outlet be intermittently pulsating, or undulating pulsating. In Fig. 4ª, etc., the glass has a pulsating issuance from the orifice, its time of issuance being controlled in any suitable manner as for instance, by the reciprocating needle A'. In Fig. 4ª, this needle is raised and flow has started from the outlet. In Fig. 4ᵇ, the needle has been depressed, cutting off flow from the outlet, but the flow which has occurred, has resulted in the accumulation of a globular mold charge $c$ which hangs from the outlet, slowly moving down and forming a neck $d$ immediately below the outlet. The movement of gob $c$ is under gravity, retarded by the tenacity of the glass at the neck which is being drawn out. The severing mechanism is represented as entering the neck to sever it and as simultaneously moving downward. In Fig. 4ᶜ, the severing of the charge $c$ has been completed, and the severed charge is dropping into the mold B *en masse*. In Fig. 4ᵈ, the severing mechanism has moved away from the line of movement of the glass, and the glass forming the neck $d$ under surface tension tends to assume a spherical form. If now the needle be again raised to permit an additional flow of glass, the glass then issuing from the outlet becomes incorporated with the glass left in the neck $d$ and the formation of a new charge gob starts.

The processes above described were obviously capable of being carried out by numerous embodiments, and I have, for purposes of illustration, shown mechanism adapted therefor.

The glass outlet may take any desired form, although I have, in Fig. 5, shown a construction thereof which will be found suitable. As here represented, the outlet is in the form of an orifice formed in the bottom of a block 1 of suitable refractory material, such block forming in itself the bottom or the part of the bottom of a suitable container or chamber 5 having molten glass therein. Such chamber may be connected to a melting furnace, or may receive glass therefrom in any suitable manner, many ways of which are known to the art. A needle 6 is shown as contained within the chamber. This needle may either serve as a regulator to determine the rate of flow of the glass out of the orifice, or may be given a reciprocating vertical motion, in which case it will serve to either permit intermittent or undulating pulsations in the flow of glass from the orifice dependent upon the manner and extent of its reciprocation. Thus if the needle when fully depressed closes the orifice, against the issuance of glass, the flow of glass therefrom will be intermittent, while if the needle merely changes from time to time the flow rate, the flow from the orifice will be of undulatory pulsating character. As before pointed out, my invention contemplates any of the above methods of flow.

Below and around the flow orifice is provided a suitable burner 15 having induction pipe 13 by which the glass issuing from the orifice is heated.

Located at a proper distance below the orifice, and adapted to be projected across the line of movement of the glass therefrom, are the shear blades 18 and 19 which have a capacity not only of movement across the line of the movement of glass, but are capable of movement downwardly in the direction of movement at the same time they project across the line of movement. Mechanism suitable for accomplishing this is shown in Figs. 6, 7 and 8, although it will be understood that in the broader aspects, my invention is not limited to the peculiar mechanism shown, and that the same is capable of numerous modifications without departing from the spirit of this invention. As there shown, the shear blades 18 and 19 are mounted in guides 20 for reciprocating motion to and from the line of movement of the issued glass, the guides being connected by the cross bars 20'. The shear blades are properly shaped when projected toward each other to sever glass passing between them.

A hollow frame 24 is mounted beneath and around the line of movement of the issued glass, it being supported by brackets 36, and carries in each end, a shaft 25, the shafts on the opposite ends being driven in synchronism by beveled gears 34 and 35, and the longitudinal shaft 35ª.

Each shaft carries thereon centrally an eccentric 32, and two eccentric cams 27, one on each end of the shafts inside of the sides of the frame. By preference, the cams are angularly shiftable on the shafts by means of the pinion 26, and lock mechanism 26ª.

Ears 21 fastened to the side bars project over the cams 27 and are normally held in contact therewith by the springs 23 encircling the studs 22 which project from the ears 21 through the frame 24. Suitable straps 31 encircle the eccentrics and through the pitman rods 30 secured in knuckles 29 on the shear blades, actuate the latter in the slides 20. It will thus be seen that as the shafts are actuated, the knives will be moved to and from each other, and in their movement toward each other will be given a downward motion by the springs 23 which hold the ears 21 against the cams. After the severing has been thus effected, they will be opened and lifted. These motions may be simultaneous or successive as desired.

The flow orifice, the heater and the needle shown in Fig. 5, do not in themselves form the subject-matter of an invention claimed in this application.

Having thus described my invention, what I claim and desire to secure by Letters Patent is,—

1. The hereinbefore described process of obtaining glass mold charges which consists in causing glass to issue from a suitable outlet, and while moving under gravity to sever it into charges and imparting to the severing means while severing a movement having a component in the direction of the movement of the glass at the severing point.

2. The hereinbefore described process of obtaining glass mold charges which consists in causing glass to issue from a suitable outlet, and while moving under the influence of gravity, in severing such glass into successive charges and imparting to the severing means, while severing, a movement having a component in the direction of such movement of the glass at the severing point.

3. The hereinbefore described process of obtaining glass mold charges which consists in causing glass to issue from a suitable outlet, and while moving under the influence of gravity, in severing such glass into successive charges and moving the severing means while severing in the direction of the gravity movement of the glass at a velocity at least as great as the velocity of such movement of the glass.

4. The hereinbefore described process of obtaining glass mold charges which consists in causing glass to issue from a suitable outlet, and while moving under the influence of an accelerating force in severing such glass into successive charges and moving the severing means while severing in the direction of the movement of the glass under the accelerating force at a velocity greater than the velocity of the glass at the severing point.

5. The process of obtaining mold charges of glass which consists in causing glass to flow under an accelerating force, in severing such glass into mold charges, and in causing the glass between the severing means to move during the severing more rapidly in the line of flow than its movement therein due to the accelerating force alone.

6. The process of obtaining mold charges of glass which consists in causing glass to flow under an accelerating force, in severing such glass into charges, and during the severing of a charge causing the cut so formed to open up to prevent, until the severing of the next charge, contact between the upper surface of parts moving with the severing means and the glass at points already severed.

7. The process of obtaining mold charges of glass which consists in causing movement of glass under an accelerating force, the severance of such glass into charges, and accelerating the movement of the severed glass in the direction of its previous movement by force exerted thereon through the severing means.

8. The process of separating molten glass into mold charges which consists in flowing the glass from a suitable outlet, cutting charges from the end of the resultant flow and moving the cutting edges away from the outlet while cutting, and thereby obtaining a convex end surface on the remaining stub.

9. The process of obtaining charges of molten glass which consists of flowing the glass from a suitable outlet, cutting the resultant flow into charges, and moving the cutting means while cutting in the direction of the flow of the glass with a velocity sufficient to carry the cutting means in advance of, and out of contact with the progressively cut surface behind the cutting edge.

10. In an apparatus for obtaining mold charges of molten glass, the combination with a flow outlet adapted to deliver the molten glass, of severing means mounted for movement with and also across the path through which the glass flows by gravity, and separate means for effecting the said separate movements.

11. In an apparatus for obtaining mold charges of molten glass, the combination with a flow outlet adapted to deliver the molten glass, of a severing means, means for moving the severing means diagonally across the line of the gravity flow of the glass, and means for varying the vertical component of such movement independently of any variation in the horizontal component.

12. In an apparatus for obtaining mold charges of molten glass, the combination with a flow outlet adapted to deliver the glass, and from which the glass flows by gravity, of a cutting mechanism comprising a pair of shear members adapted to sever the glass flowing therefrom by gravity into mold charges, and means for closing the shear members to sever the glass and to simultaneously move them in the direction of gravity flow.

In testimony whereof I have signed my name this 21st day of March, 1917.

ENOCH T. FERNGREN.